United States Patent

[11] 3,589,663

| | | | |
|---|---|---|---|
| [72] | Inventor | Charles M. Vance | |
| | | P.O. box 8155, Atlanta, Ga. 30306 | |
| [21] | Appl. No | 770,697 | |
| [22] | Filed | Oct. 25, 1968 | |
| [45] | Patented | June 29, 1971 | |

[54] MOUNTING FOR ADJUSTABLE REARVIEW MIRROR ASSEMBLY FOR VEHICLES
6 Claims, 3 Drawing Figs.

[52] U.S. Cl. ................................. 248/480,
16/95, 248/228, 296/97
[51] Int. Cl. ................................. B60r 1/04
[50] Field of Search .......................... 248/467,
475—480, 279, 228, 298, 286; 296/97; 350/307;
16/95 D, 96 D

[56] References Cited
UNITED STATES PATENTS

| | | | |
|---|---|---|---|
| 2,168,003 | 8/1939 | Stone | 248/478 |
| 2,719,691 | 10/1955 | Vance | 248/476 |
| 2,799,464 | 7/1957 | D'Azzo | 248/298 X |
| 3,333,887 | 8/1967 | Dryden | 296/97 |
| 3,403,937 | 10/1968 | Quaine | 296/97 |
| 3,131,251 | 4/1964 | Ryan | 248/467 |

*Primary Examiner*—Roy D. Frazier
*Assistant Examiner*—Frank Domotor
*Attorney*—Cushman, Darby & Cushman

ABSTRACT: Improved supporting means are provided for a rearview mirror assembly adapted for transverse adjustment throughout substantially the entire width of a vehicle. The improved supporting means comprise a slotted elongated bar which can be affixed by means of an adhesive strip to extend across the top of the windshield of the vehicle. Improved means are also provided for fixing the position of the guide element to which the rearview mirror is attached in the desired position along the slotted elongated bar.

PATENTED JUN29 1971 3,589,663

INVENTOR
CHARLES M. VANCE

BY Cushman, Darby & Cushman
ATTORNEYS

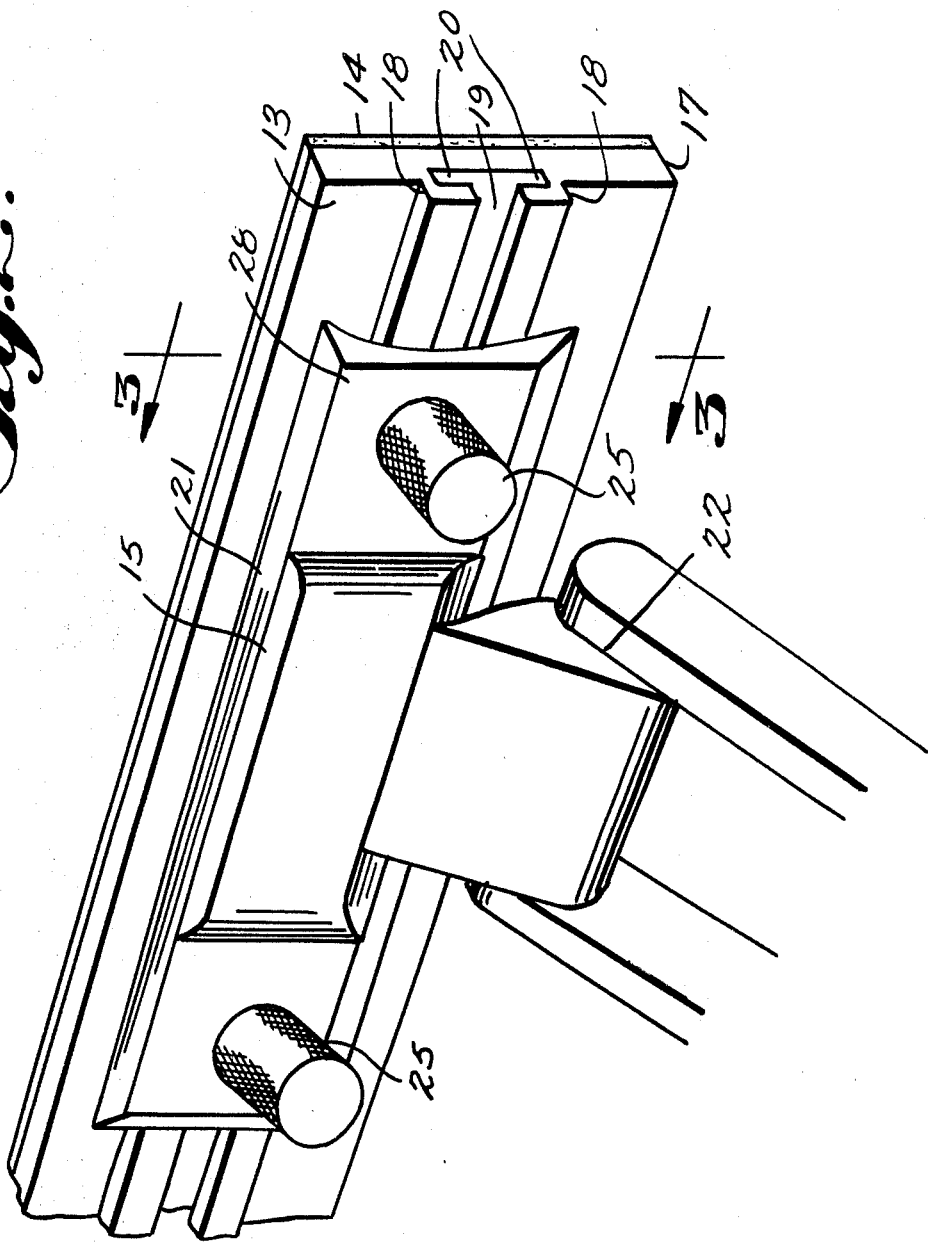

MOUNTING FOR ADJUSTABLE REARVIEW MIRROR ASSEMBLY FOR VEHICLES

This invention relates to rearview mirrors for automobiles and other vehicles and more particularly it relates to an improved means for supporting a rearview mirror mounted on an elongated supporting bar which extends across substantially the entire width of the vehicle, and adapted for transverse adjustment along the length of the supporting bar.

U.S. Pat. No. 2,719,691, discloses a rearview mirror assembly for vehicles wherein the rearview mirror adapted to extend across substantially the entire width of the interior of the vehicle is mounted on an elongated bar, by means of U-shaped guide elements comprising a vertical bight portion which engages the rear surface of the bar and a pair of horizontally extending legs and inwardly extending flanges which engage the forward surface of the bar. The mirror itself is attached to the U-shaped guide element by means of two links, one of which is connected to the mirror by means of a ball and joint and the other of which is attached on one end to the guide and on the other end by a functional horizontal pivot to the first link. A wingbolt is threaded through a leg of the U-shaped guide to engage the bar and fix the position of the guide on the bar. The longitudinal bar is itself attached to the windshield mounting of the vehicle by means of attaching arms spaced along the bar and screwed to the windshield mounting. This assembly, disclosed in U.S. Pat. No. 2,719,691, permits a plurality of mirrors, suitably mounted on guides, to be attached to the elongated bar extending across the interior of the car and to be each moved across the bar and adjusted as desired.

While the rearview mirror assembly disclosed in U.S. Pat. No. 2,719,691 provides a convenient means for easily mounting a plurality of the rearview mirrors within the interior of a vehicle and adjusting them horizontally to any position across substantially the entire width of the vehicle, it is desirable to provide easier and more substantial means for mounting the elongated supporting bar disclosed in U.S. Pat. No. 2,719,691 on to the vehicle. It is also desirable to provide easier and more secure means for securing the mirror in the desired position along the supporting bar.

Accordingly it is an object of this invention to provide an improved means for securing a rearview mirror to an elongated supporting bar adapted to extend across substantially the entire interior width of a vehicle in such a manner that the mirror can be moved to substantially any position along that supporting bar and secured easily and firmly in that position. It is a further object of this invention to provide an improved means for securing the elongated support bar to the windshield mounting of the vehicle, whereby the support bar can be quickly and easily mounted in the vehicle without the necessity for drilling holes in the windshield mounting of the vehicle.

According to the present invention, these and other objects are accomplished by providing an elongated supporting bar for the rearview mirror of an automobile which comprises a slotted bar adapted to extend across the front windshield of an automobile. The elongated supporting bar of this invention can be made of any suitable metal, such as, for example, aluminum, or other suitable materials, such as plastic which possesses the necessary degree of rigidity. Advantageously, the elongated support bar of this invention is provided with an adhesive strip fixed to the support bar on the opposite side from the slot and preferably extending across substantially the full length of the support bar so that the support bar can easily and quickly be attached to the top of the windshield of the vehicle or to the top of the windshield frame without the need to drill holes in the frame or the body of the vehicle itself in order to mount the elongated bar.

The present invention may, however, best be understood with reference to the accompanying drawings.

FIG. 2 is a fragmentary perspective view showing in greater detail a portion of the slotted elongated support bar and the guide element to which the rearview mirror (not shown) is attached by means of attaching arms.

Figure 1:
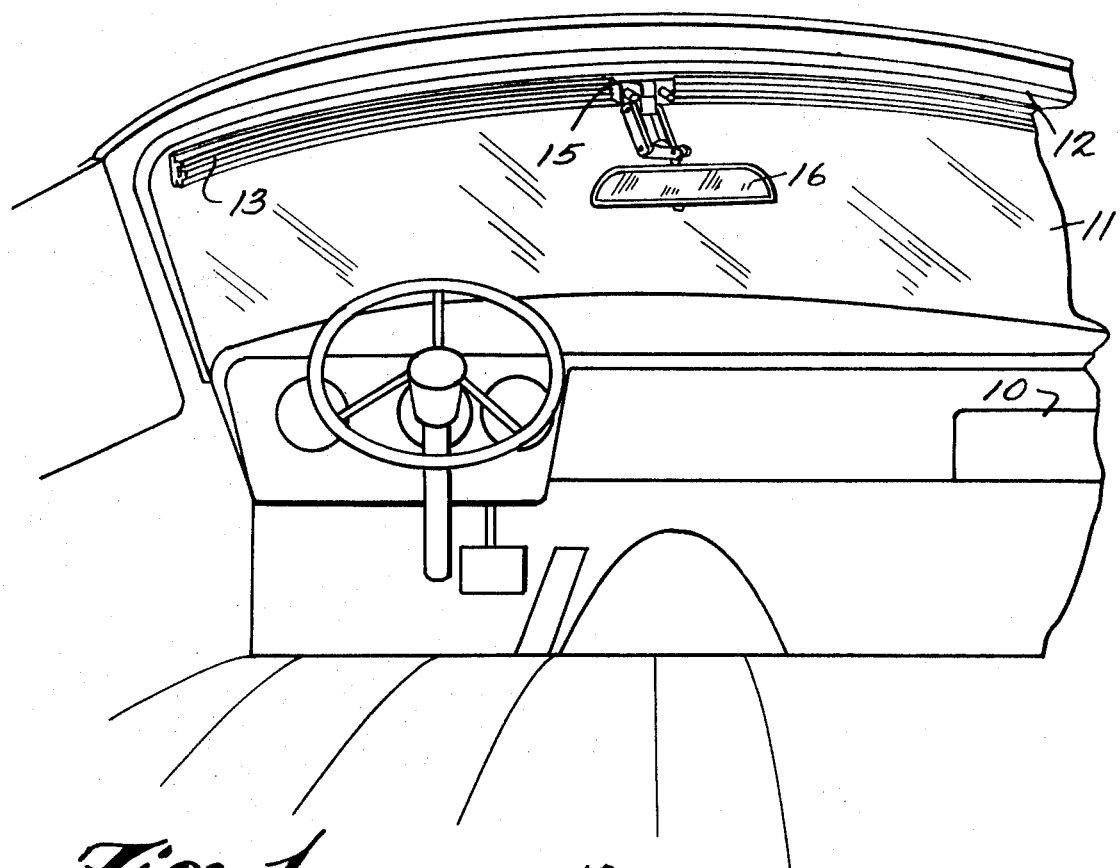
FIG. 1 is a fragmentary perspective view of the front dashboard area of an automobile showing an embodiment of the present invention.
Figure 3:
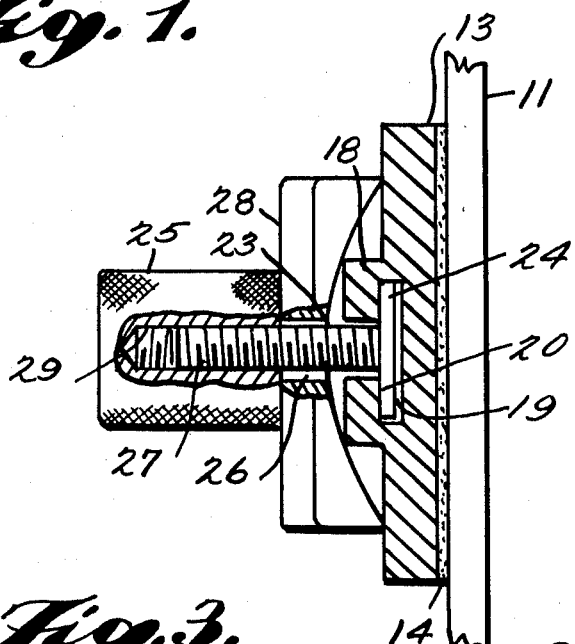
FIG. 3 is a partial sectional view of the end of the elongated bar showing the guide element and, in detail the means by which the guide element is firmly positioned on the elongated support bar.

Referring to the drawings, 10 designates an automotive vehicle having a windshield 11 and a windshield molding 12, all of which forms no part of the present invention.

The rearview mirror assembly of the present invention comprises an elongated supporting bar 13 which is adapted to extend across substantially the entire width of the vehicle 10. As shown in FIG. 1, the supporting bar 13 may be curved to conform with the curvature of the windshield 11. The elongated supporting bar is attached to the top of the windshield or the windshield frame or any other desired and sufficiently substantial portion of the vehicle by means of an adhesive strip 14 affixed to the side of the elongated supporting bar opposite the guide element 15 and mirror 16. Advantageously the adhesive strip extends across substantially the entire length of the elongated supporting bar.

Referring to FIG. 2, the elongated supporting bar 13 comprises an elongated strip 17 having on the side opposite the adhesive strip 14 and the windshield of the vehicle and disposed along the longitudinal length of the strip two parallel legs 18 mounted at right angles to said strip and turned inwardly toward each other to form a slot 19 consisting of two inwardly facing channels 20 along substantially the entire longitudinal length of said elongated strip.

One or more guide elements 15 are mounted on the bar 13 for sliding movement throughout substantially its longitudinal extent. The guide element comprises a faceplate 21 having means affixed thereto for adjustably carrying the mirror, said means being, for example, supporting brackets 22 which advantageously can be suitably hinged or otherwise flexibly jointed to permit adjustment of the mirror to the desired position or as a safety feature to permit the mirror to "give" on impact, and means for fixing said guide element in the desired position along the elongated supporting bar.

According to the present invention, the means for fixing the position of the guide element 15 along the elongated bar 13 comprises a plurality of bolts 23, each having attached thereto at one end a rectangular head 24 of approximately the same width and thickness of the slot 19 in the elongated supporting bar 13. The rectangular head of each bolt 23 is disposed in the slot 19 on the supporting bar formed by the two parallel, inwardly facing channels 20. Said rectangular head must, therefore, not fit too snugly in the slot but be able to pass freely within the slot in the longitudinal direction when the nut 25 is loosened. The rectangular head must, however, be of sufficient size that two of its opposite sides remain channeled in the slot without turning, since otherwise the nut 25 could not be tightened as the bolt 23 would turn. The bolt 23 to which the rectangular head is attached is disposed in a direction perpendicular to and away from the slot and the elongated bar and passes up and through a suitably positioned hole 26 in the faceplate 21 of the guide element, said hole being larger than the diameter of the bolt so that the sides of the hole exert no binding effect on the bolt. The stem 27 of the bolt 23 extends beyond the surface 28 of the faceplate for a short distance sufficient to permit the nut 25 to be attached thereto and is suitably provided with male threads to accommodate the corresponding female threads on the nut 25. The nut 25 is larger than the hole 26 and the threaded portion is of greater length than the length of the stem of the bolt 27 extending beyond the surface of the faceplate 28 so that the nut can be tightened on the bolt sufficiently to cause the rectangular head of the bolt to be drawn up tightly against the inwardly turned legs 18 which form the channels 20 in which the head is disposed so that the guide element 15 can be fixed in a given position on the elongated bar. Alternatively, the nut may be provided with an unthreaded portion 29 extending within the nut beyond the portion which is threaded so that the total depth of the cavity in the nut is greater than that of the bolt projecting beyond the faceplate. It is also preferred that the nut 25 be of a closed or capped type on one end and be provided with a roughened outer surface to facilitate tightening.

In practice when the nuts 25 are loosened the guide element 15 to which the mirror is affixed can be moved to any desired position along the slotted elongated bar. Due to the unique design and employment of the rectangular headed bolt and the nut with the slot bar, once the nut is tightened it is subject to little vibration and does not have to be repeatedly retightened as there is no significant contact between the bolt and the sides of the hole through which it passes, the tightening pressure being exerted in directly inwardly by the nut and the rectangular head.

It is to be understood that the form of the invention herewith shown and described is to be taken as the preferred embodiment and that various changes may be made without departing from the spirit of the invention or the scope of the appended claims.

I claim:

1. In an assembly for use with a vehicle having a windshield and a frame therefor, said assembly being to support a rearview mirror for transverse adjustment throughout substantially the entire width of the vehicle, and said assembly comprising an elongated bar having a length sufficient to extend throughout substantially the entire width of the windshield, said bar being longitudinally curved to conform generally to the curvature of the upper extent of said windshield frame, a guide element having means for adjustably carrying a rearview mirror, said guide element being mounted on said bar for sliding movement throughout substantially the entire longitudinal extent thereof, and means carried by said guide element and cooperating with said bar for fixing said guide element to said bar in any adjusted position along the longitudinal extent thereof, the improvement wherein said elongated bar comprises an elongated strip disposed along the side opposite the windshield of the vehicle and along the longitudinal length of the strip and having two parallel legs at right angles to said strip and turned inwardly toward each other to form a slot consisting of two inwardly facing channels along substantially the entire longitudinal length of said elongated strip, said guide element including a rectangular faceplate having an arcuately shaped surface adapted to fit snugly over the parallel legs forming said slot, means located centrally on the opposite surface of said faceplate for holding said mirror and adjustable means located on both sides of said mirror holding means with portions thereof extending into said slot for adjustably sliding and fixing said faceplate along said strip.

2. An assembly as described in claim 1 wherein said adjustable means comprise a plurality of bolts each having attached to one end thereof a rectangular head, and a nut for said bolt, said rectangular head being of approximately the width and thickness of the slot in the elongated bar but being able to pass freely along the said slot without turning, and said bolt passing outwardly away from said slot and perpendicular to said elongated bar through a hole provided in said faceplate, said hole being larger than the diameter of said bolt and said nut being larger than said hole and being threaded to fit the end of the bolt and the threaded portion of said nut being greater in length than the length of the bolt projecting beyond the hole in the faceplate so that said nut can be tightened on said bolt to fix said guide element in a given position along the elongated bar.

3. An assembly as described in claim 1 wherein the elongated bar is made of plastic.

4. An assembly as described in claim 1 wherein the elongated bar is made of aluminum.

5. An assembly as described in claim 1 wherein the elongated bar is affixed to the top of the windshield of the vehicle by means of an adhesive strip attached to the elongated bar on the side opposite the slot.

6. The assembly of claim 5 wherein the adhesive strip is attached to substantially the entire length of the elongated bar.